United States Patent [19]

Ohno et al.

[11] Patent Number: 4,801,398

[45] Date of Patent: Jan. 31, 1989

[54] METHOD OF PREPARING FLUORESCENT MATERIAL OF SMALL PARTICLE SIZE

[75] Inventors: Katsutoshi Ohno, Tokyo; Abe; Yuichi Kimizuka, both of Kanagawa, all of Japan

[73] Assignee: Sony Corporation, Tokyo, Japan

[21] Appl. No.: 201,369

[22] Filed: Jun. 1, 1988

Related U.S. Application Data

[63] Continuation of Ser. No. 925,154, Oct. 31, 1986, abandoned.

[30] Foreign Application Priority Data

Oct. 31, 1985 [JP] Japan .............................. 60-244561

[51] Int. Cl.⁴ ............................................ C09K 11/84
[52] U.S. Cl. ...................... 252/301.4 R; 252/301.4 S
[58] Field of Search .................... 252/301.4 R, 301.4 S

[56] References Cited

U.S. PATENT DOCUMENTS

| | | | |
|---|---|---|---|
| 2,187,022 | 1/1940 | Flechsig | 252/301.4 S |
| 3,368,980 | 2/1968 | Avella et al. | 252/301.4 R |
| 3,457,184 | 7/1969 | Kobayashi et al. | 252/301.4 R |
| 3,502,590 | 3/1970 | Royce et al. | 252/301.4 S |
| 4,469,619 | 9/1984 | Ohno et al. | 252/301.4 R |
| 4,479,886 | 10/1984 | Kasenga | 252/301.4 R |

FOREIGN PATENT DOCUMENTS 701754 12/1953 United Kingdom .
1018892 2/1966 United Kingdom .
1576368 10/1980 United Kingdom .

*Primary Examiner*—Jack Cooper
*Attorney, Agent, or Firm*—Hill, Van Santen, Steadman & Simpson

[57] ABSTRACT

A fluorescent material of small size is prepared by synthesizing a fluorescent material of predetermined molecular structure in a single phase, pulverizing the fluorescent material thus produced and then heat treating the pulverized material under conditions sufficient to recover the luminance characteristics which were lost as a result of pulverizing.

4 Claims, 6 Drawing Sheets

10 μm

10 μm

10μm

10μm

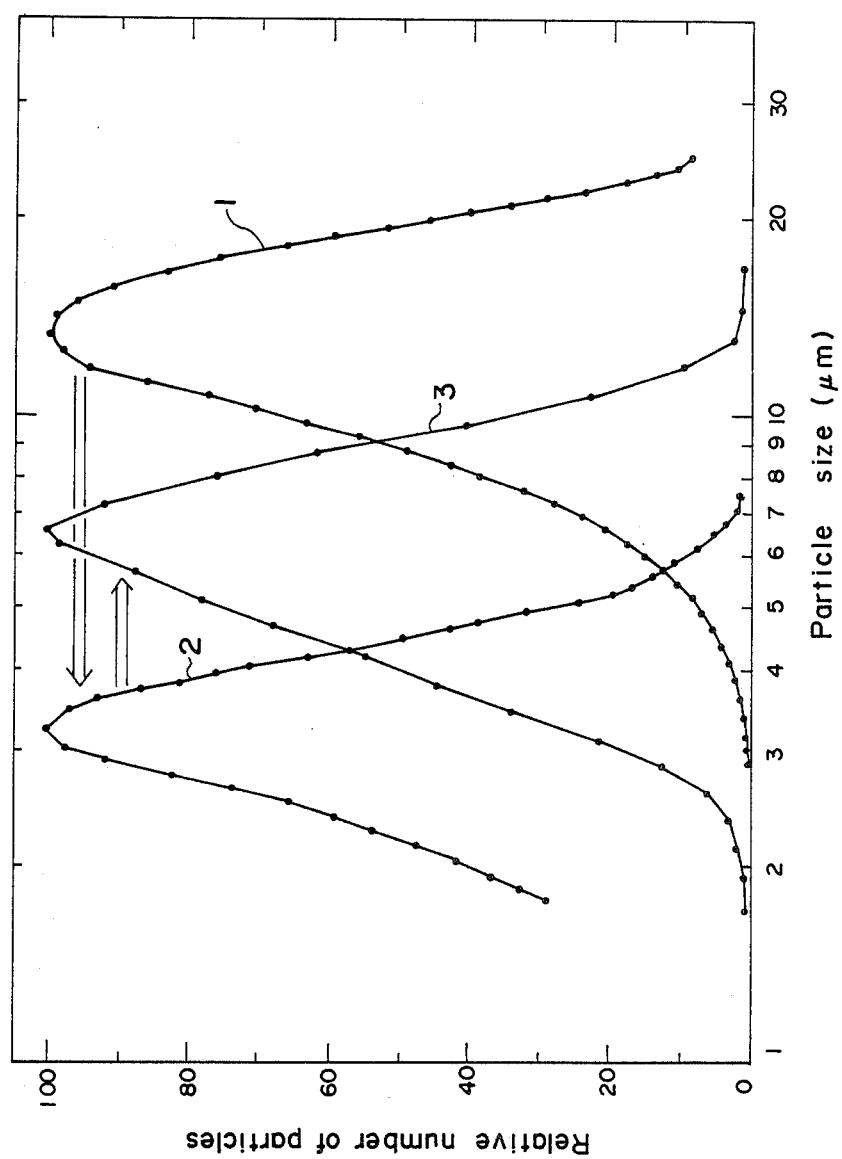

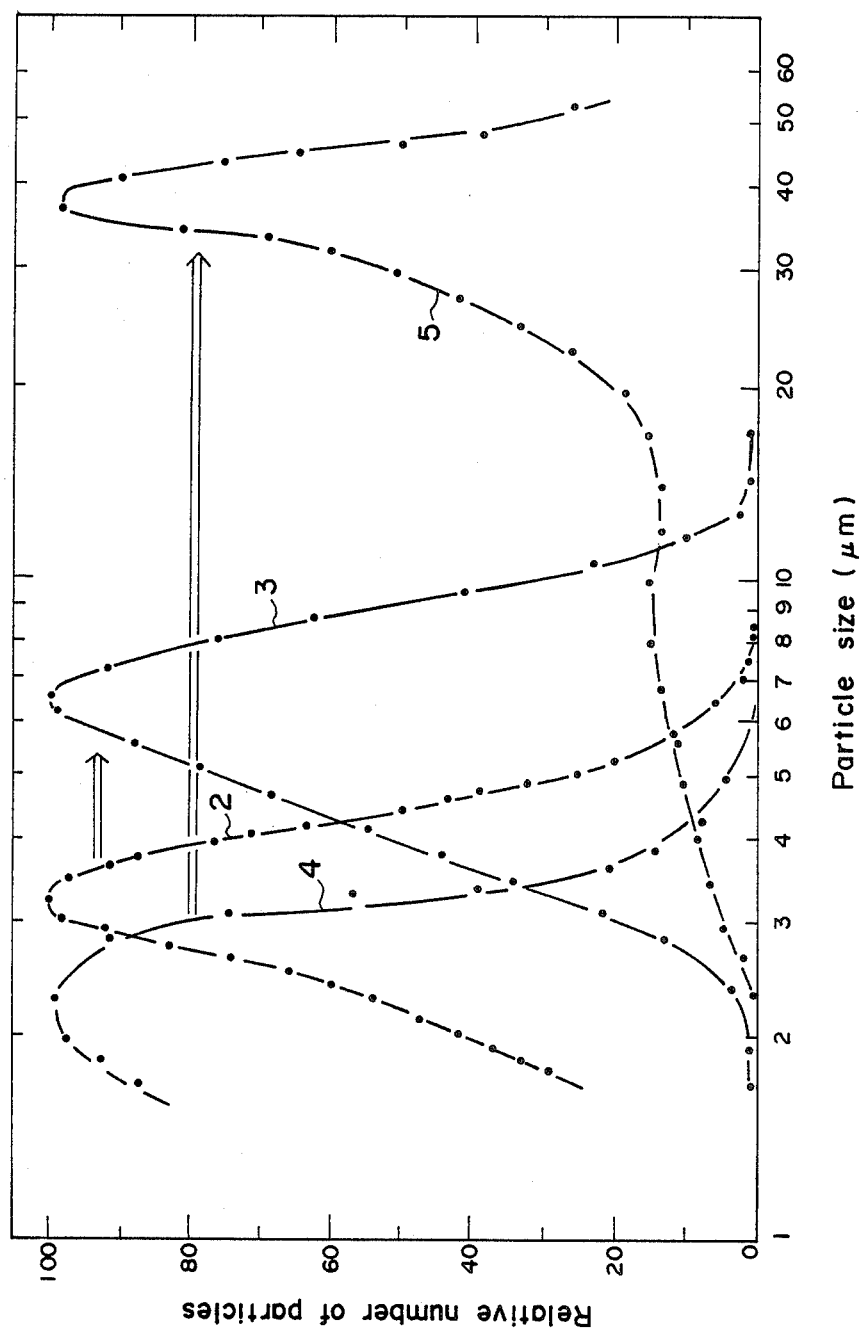

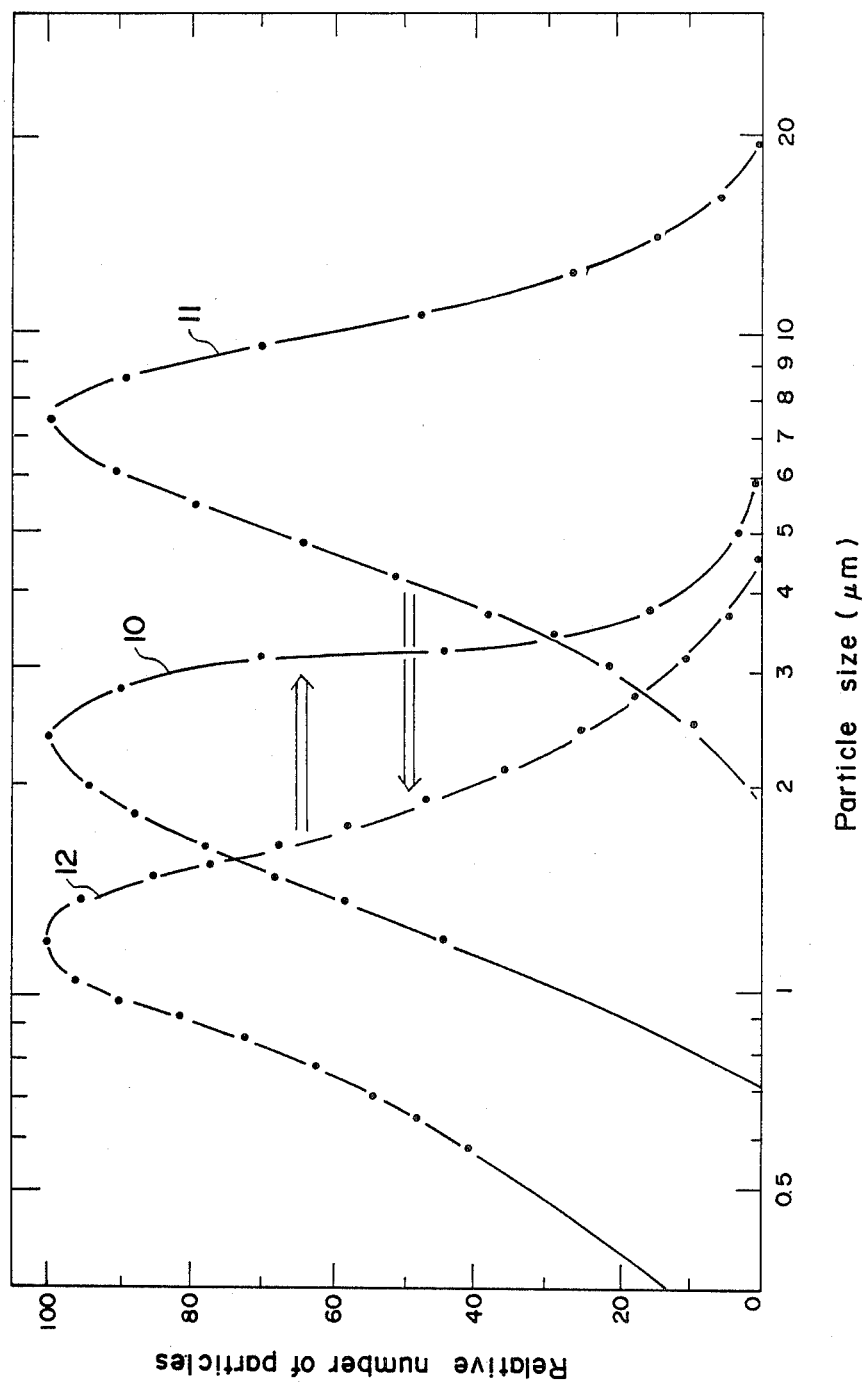

METHOD OF PREPARING FLUORESCENT MATERIAL OF SMALL PARTICLE SIZE

This is a continuation of application Ser. No. 925,154, filed Oct. 31, 1986, now abandoned.

BACKGROUND OF THE INVENTION

1. Field of the Invention

The present invention is in the field of preparing fluorescent material of small particle size suitable for use on fluorescent surfaces of high luminance and high fineness cathode ray tubes such as those used, for example, in airplane cockpits or in television projectors.

2. Description of the Prior Art

Color cathode ray tubes used, for example, in cockpits of airplanes or for color television projectors must have a high resolution power, a high degree of fineness, and high luminance. Generally, the fluorescent surface of a color cathode ray tube is coated in a predetermined pattern such as a stripe or dot pattern with fluorescent materials corresponding to the primary colors, in a narrow width. As the resolution power and the fineness have been increased, a higher density is required for the pattern. A particle size of about 10 microns (um) which is typical for the usual fluorescent material particles is too large to obtain an optimum coating thickness for the fluorescent material necessary for attaining high luminance. In view of the foregoing, it is necessary to prepare fluorescent material of small particle size in order to obtain a color cathode ray tube of high luminance and a high degree of fineness.

Fluorescent materials of small particle size have been made by several processes in the prior art. A first method involves reducing the amount of flux added to the fluorescent material or avoiding the use of the flux altogether upon forming the fluorescent material, thereby suppressing crystal growth.

A second method involves filtering or sieving fluorescent material of small particle size separated from fluorescent material produced by the usual method.

A third method consists of pulverizing fluorescent material produced in the usual manner into a smaller particle size.

The first method involves the disadvantage that the particle growth remains in an intermediate and thus unstable stage. A desired fluorescent product cannot be obtained as a single phase which reduces the luminance.

The second method is difficult to carry out and provides an extremely low yield.

The third method involving pulverizing is not very acceptable because pulverizing injures the particle surface so as to reduce the luminance as much as from 30 to 40% of the inherent luminance.

When the fluorescent pattern for each of the colors is made finer, the luminance tends to be lowered in the formation of the fluorescent surface due to the packing density of the fluorescent particles in each of the portions and accordingly, a higher luminance is required of the fluorescent particles.

SUMMARY OF THE INVENTION

The present invention seeks to provide a method for preparing fluorescent material of small particle size in which a material of high luminance can be obtained at a good yield.

In keeping with the present invention, a fluorescent material of small size is achieved by first synthesizing a fluorescent material of predetermined molecular structure in a single phase, pulverizing the thus prepared fluorescent material whereby its luminescence is decreased and then heat treating the pulverized material under conditions such that it recovers substantially all the luminescence lost as a result of pulverizing.

In the present invention, a single phase or mono-phase of the desired fluorescent composition is first prepared and then pulverized into fine particles. The fine particles are in the mono-phase but the luminance thereof is lowered as a result of the pulverizing. Then, the fine particles are subjected to heat treatment by means of which the pulverized fine particles are sintered and the luminance lost by pulverizing is recovered.

In the present invention, a fluorescent material which is stable and possesses high luminance in the mono-phase is prepared through complete crystal growing and subsequent pulverization. By applying the succeeding heat treatment, the luminance lowered by the injury at the surface of the particles is recovered, thereby producing a fluorescent material of high luminance and small particle size at a good yield.

BRIEF DESCRIPTION OF THE DRAWINGS

The features of the invention and the advantages thereof will become apparent from the following description of the preferred embodiments with reference to the accompanying drawings in which:

FIG. 4 is a diagram illustrating particle size distribution after each of the steps;

FIG. 5 is a particle size distribution diagram for the invention and a comparative example;

FIG. 8 is a diagram illustrating the particle size distribution showing the steps of the process.

DESCRIPTION OF THE PREFERRED EMBODIMENTS

The following specific examples illustrate the method of the present invention as it is applied to various fluorescent materials.

EXAMPLE 1

A green phosphorescent material of mono-phase $Y_3Al_5O_{12}$:Tb was synthesized in the following manner. For the synthesis, 321.78 g of $Y_2O_3$, 254.9 g of $Al_2O_3$ and 28.04 g of $Tb_4O_7$ was used as the starting material for forming one mol of $Y_3Al_5O_{12}$:Tb. The powders were mixed and sintered using 20 mol % of $BaF_2$ as a flux. The sintering occurred at 1500° C. for two hours to obtain $Y_3Al_5O_{12}$:Tb. A method as disclosed in Japanese Laid-Open Application No. Sho 58-57491 can be applied to the synthesis of $Y_3Al_5O_{12}$:Tb, in which case the acid or alkali washing procedure after the synthesis can be dispensed with.

The thus obtained $Y_3Al_5O_{12}$ :Tb in the mono-phase was pulverized as the second step. In the pulverization stage, the following mixture was charged into a 10 liter volume polyethylene bottle:

| | |
|---|---|
| $Y_3Al_5O_{12}:Tb$ | 2200 g |
| Alumina ball (5 mm diameter) | 9600 g |
| $H_2O$ | 3600 g |

The mixture was subjected to ball mill pulverization with a rotation of 60 rpm for 15 hours.

Then, 110 g of $BaF_2$ as the flux were added to the pulverization product and subjected to ball mill pulverization for an additional hour. Then, the balls were removed, and the products were filtered and dried.

As the third step, the products of pulverization were charged in an alumina crucible, heated to 1500° C. at a temperature increase of 200° C. per hour in a heating furnace. For this particular phosphor, the heat treating temperature can be carried out at temperatures from about 1400° to 1700° C. After maintaining the mixture at 1500° C. for two hours, the products were cooled in the furnace. Then, an acid or alkali washing treatment was applied to remove the residual flux.

The fluorescent material thus obtained showed no substantial reduction in the luminance as compared to the luminance of the originally synthesized mono-phase fluorescent material despite the treatment in the pulverization step. Taking an emission luminance of the fluorescent material after the first step in the example as 100%, it was determined that the luminance was lowered to 70% after the second step, but recovered to about 99.5% after the third step.

Figure 1:
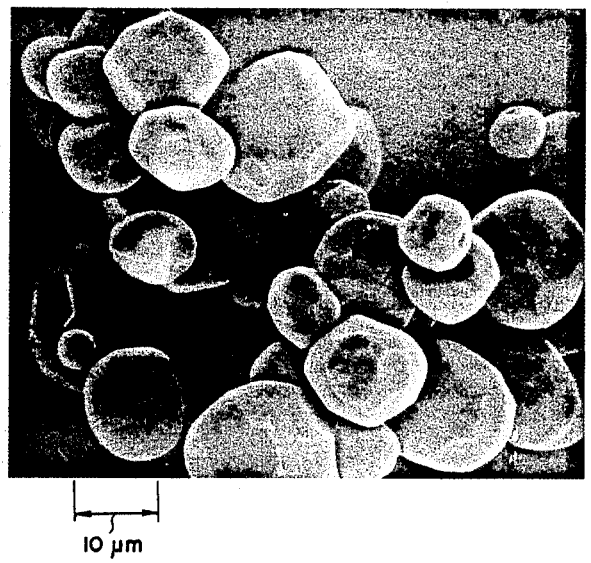
FIGS. 1, 2 and 3 are enlarged views obtained from microscopic photography after each of the steps for one embodiment of the present invention.
Figure 2:
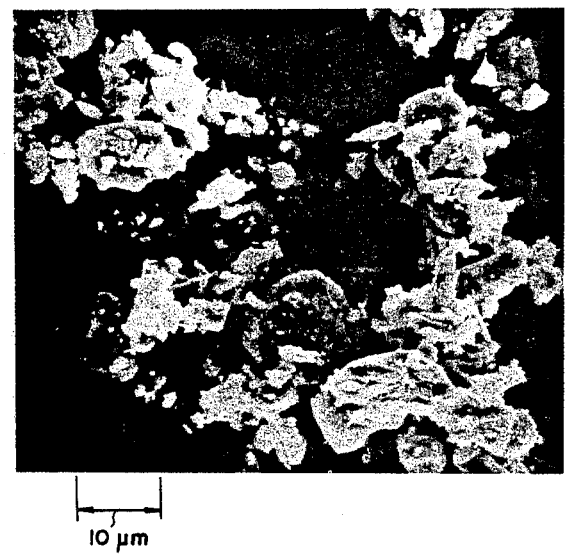
Figure 3:
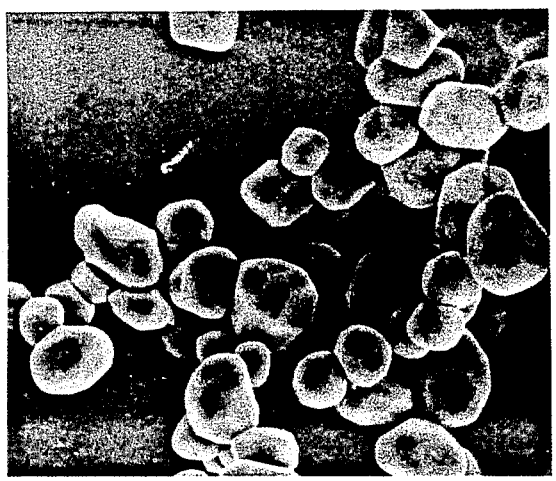
Figure 6:
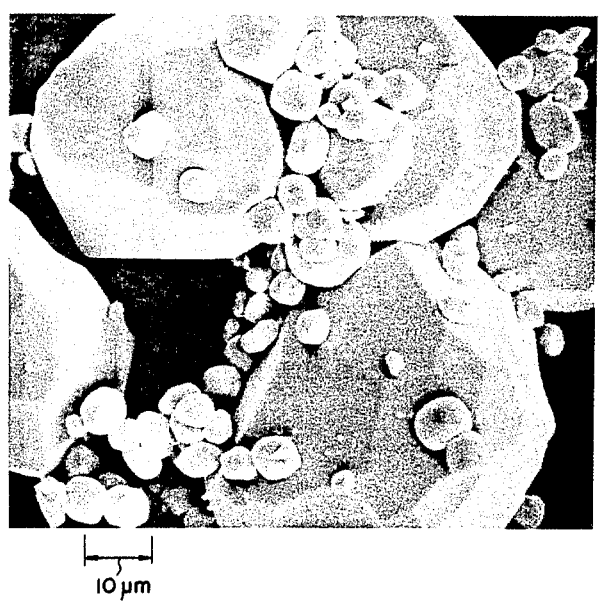
FIG. 6 is an enlarged view illustrating the fluorescent particles obtained from microscopic photography for comparative examples.

FIGS. 1, 2 and 3 are enlarged views illustrating, respectively, the state of particles after the first synthesis step, the second step of pulverizing, and the third, heat treating step obtained from a scanning type electron microscopic photograph. As can be seen from these Figures, a fluorescent material of large particle size after the first step shown in FIG. 1 is irregularly cracked by the pulverizing treatment in the second step (FIG. 2) but fluorescent material of a fine particle size having an excellent uniformity and improved shaping properties can be obtained through sintering with the heat treatment at the third step (FIG. 3).

FIG. 4 shows the result of measurements of particle size distribution of fluorescent particles in each of the steps, curve 1 showing the particle size distribution after the first step, curve 2 showing the particle size distribution after the second step, that is, after the pulverizing treatment, and curve 3 showing the particle size distribution after the sintering heat treatment. It can be seen that although the particles are finer after the third step as compared with the first step, the fluorescent material which had been pulverized in the second step was sintered.

It can be seen that although the particle size of the fluorescent material can be reduced to less than one-half that which exists in the mono-phase synthesis, there is no substantial reduction in the luminance due to pulverization under the conditions of Example 1.

In the method of preparing the fluorescent material of small particle size according to the present invention, it has been observed that if the pulverizing step in, for example, a ball mill is carried out for too long, abnormally grown large particles are generated as a result of the heat treatment. For example, in Example 1 where the ball mill treatment was applied for 16 hours before the heat treating step, the average particle size in the particles before heat treatment was 3.3 μm and the volume of particles of less than um size was about 5% of the volume of particles of average particle size as shown by curve (2) in FIG. 5 (corresponding to curve (2) in FIG. 4). The average particle size after heat treatment was 5.9 μm and the distribution shown by curve (3) in FIG. 5 was obtained. In the case where the ball mill pulverization was applied for 48 hours, the particle size was as shown by curve (4) in FIG. 5 in which the average particle size was 2.8 μm and the volume of particles having a size of less than 1 μm was about 30% of the volume of particles of average size. Then, after heat treatment, the particles showed abnormal growth as large as 28.7 μm in the average particle size as shown by the distribution curve (5) in FIG. 5 and the luminance was about 85% of the initial luminance.

In view of the above, it is desirable to remove particles of less than 1 μm particle size as by sieving before the heat treatment in the third step to the extent that such submicron particles occupy less than 5% of the volume of the particles of average size.

EXAMPLE 2

This example illustrates a manner of obtaining red fluorescent material:Eu for use in color television receivers.

As a first step, there was a mixture made up containing:

| | |
|---|---|
| $Y_2O_3$ | 250 g |
| $Eu_2O_3$ | 16.23 g |
| S | 278.0 g |
| $Na_2CO_3$ | 408.4 g |
| $(NH_4)_2HPO_4$ | 39.6 g |

This mixture was charged in a 2 liter volume alumina crucible equipped with a cap, heated to 1150° C. at a temperature increase of 200° C. per hour and maintained at that temperature for two hours and then cooled in the furnace. The product was washed with cold or warm water to a pH of 7 in order to remove residual polysulfides and the like. The product was then filtered and dried.

A mixture comprising 110 g of the phosphor obtained by the first step, was combined with an alumina ball having a diameter of 5 mm and weighing 480 g, together with 180 cc of water and charged in a 0.5 liter polyethylene bottle where it was subjected to ball milling under rotation at 100 rpm.

In the heat treatment step, the following mixture:

| | |
|---|---|
| $Y_2O_2S:Eu$ (obtained by the second step) | 110 g |
| S | 32 g |
| $Na_2CO_3$ | 53 g |
| $(NH_4)_2HPO_4$ | 39.6 g | was charged in a 1 liter volume alumina crucible, heated to 900° to 1000° C. at a temperature rise of 200° C. per hour. It was maintained at that temperature for 1 to 3 hours and cooled in the furnace. The product was then washed with cold or warm water to obtain a fluorescent material of $Y_2O_2S:Eu$ of small particle size.

Figure 7:
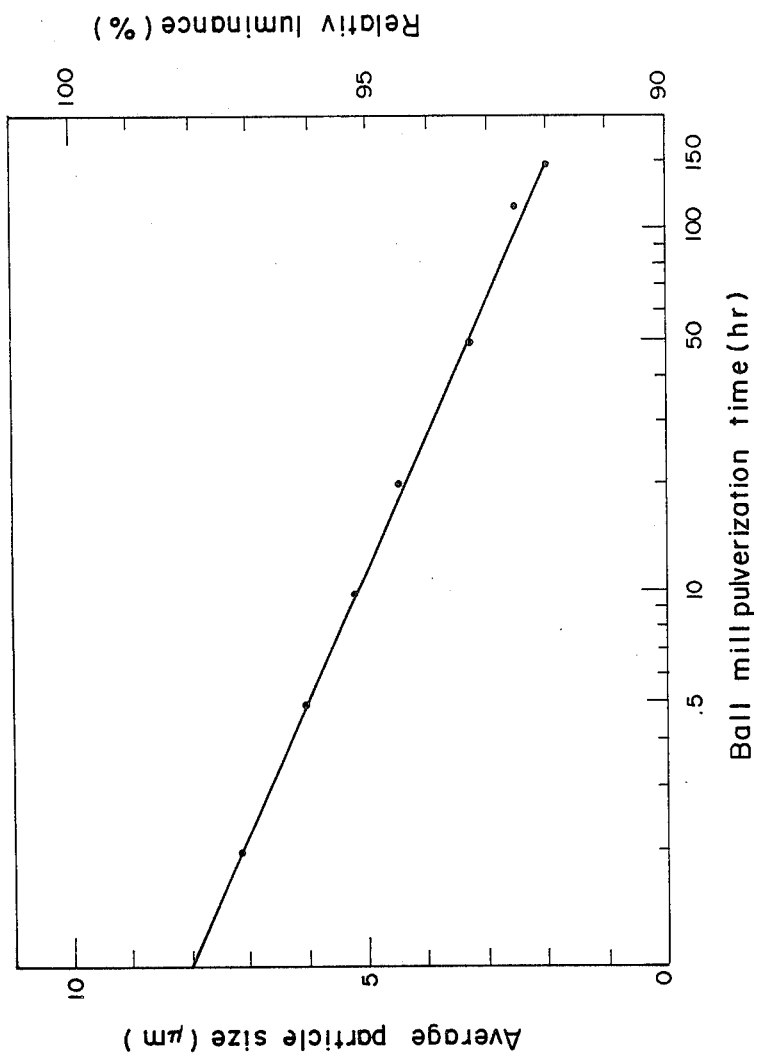
FIG. 7 is a diagram showing the relationship between the pulverization time and the particle size and luminance.

FIG. 7 shows the results of measurements of the respective average particle size of the fluorescent material obtained by varying the pulverization time in the ball mill of Example 2, and the respective relative luminances thereof.

The particle size required for the fluorescent material is determined with relation to the width of the fluorescent pattern formed by the coating of fluorescent material, for example, the width of the fluorescent stripe. In the usual 14-inch type color television receiver, the stripe width is about 250 μm and the average particle size of the fluorescent particles may be on the order of 10 μm. On the other hand, where the stripe width of the fluroescent material is about 40 μm as in the case of a cathode ray tube of high fineness, about 2 μm of particle size is required for the fluorescent material. As can be seen from FIG. 7, the relative luminance of the fluorescent material becomes lower as the average particle size of the fluorescent material becomes smaller. The luminance of the powder is about 92% in the case of an average particle size of 2 μm and, when the fluorescent surface of the high fineness cathode ray tube with 40 μm stripe width was manufactured using this fluorescent material, a favorable fluorescent surface could be obtained. If a fluorescent material of 10 μm average particle size is used in the usual process where the fluorescent stripe width is 40 μm, the film thickness relative to the luminance is not at an optimum value.

Also in Example 2, if the ball mill pulverization is carried out for too long a time, very large particles are formed in the fluorescent material finally obtained after the third stage in the same manner as explained in Example 1.

EXAMPLE 3

This example deals with obtaining a red fluorescent material Y:Eu for a cathode ray tube used in a projection television receiver.

As a first step, the following mixture was made up:

| | |
|---|---|
| $Y_2O_3$ | 2175.6 g |
| $Eu_2O_3$ | 128.4 g |
| $BaF_2$ | 350.6 g |
| Ethanol | 2650 cc |

This mixture was charged in a 20 liter volume polyethylene bottle and mixed with rotation at 30 rpm for 20 hours. The mixture was then placed in a 2 liter volume alumina crucible with a cap and heated to a temperature of 1400° to 1500° C., preferably, at 1500° C., with a temperature increase of 200° C. per hour. It was maintained at that temperature for 1 to 3 hours and then cooled in the furnace. The powder was passed through a 100 mesh sieve and disintegrated.

As a second step, the following materials were charged in a 10 liter volume polyethylene bottle:

| | |
|---|---|
| $Y_2O_3$:Eu (obtained in the first step) | 2200 g |
| $BaCl_2.2H_2O$ | 100 g |
| Alumina ball, 5 mm diameter | 9600 g |
| Ethanol | 3600 cc |

The mixture was subjected to ball milling under rotation at 65 rpm for 15 hours. The pulverized material was filtered, dried and then disintegrated through a 100 mesh sieve.

In the third step, the mixture obtained was charged in a 2 liter volume alumina crucible with cap, heated to a temperature of 1400° C. using a temperature rise of 200° C. per hour. It was maintained for 1 to 3 hours and then cooled in the furnace. Thereafter, 1000 g of the fluorescent material was subjected to acid washing by stirring for 60 minutes with 1500 cc of 3% $HNO_3$ to remove the residual flux, washed with water to a neutral pH, filtered and dried. The thus obtained fluorescent material was $Y_2O_3$:Eu fluorescent material with a 2.4 μm average particle size and exhibiting the particle size distribution shown by curve 10 in FIG. 8. Curves 11 and 12 in that Figure show the particle size of this example after the first and second step, respectively.

It will be understood that utilizing the process of the present invention produces fine particle size material which can be manufactured with little or no reduction in luminance. Accordingly, a color cathode ray tube of high luminance and high fineness for use in airplane cockpits or television projectors can be benefited by using the fluorescent material according to the present invention.

It will be understood that various modifications can be made to the described embodiments without departing from the scope of the present invention.

We claim as our invention:

1. A method of preparing a fluorescent material of small particle size which comprises:
   synthesizing a fluorescent material consisting of $Y_3Al_5O_{12}$:Tb, $Y_2O_2S$:Eu or $Y_2O_3$:Eu in a single phase;
   pulverizing the thus prepared fluorescent material whereby its luminescence is decreased,
   sieving the pulverized material so that particles of less than one micron particle size constitute less than 5% by volume of the sieved material, forming a mixture of the sieved fluorescent material and a flux, the mixture consisting of $Y_3Al_5O_{12}$:Tb and $BaF_2$ flux, $Y_2O_2S$:Eu and $Na_2CO_3$-$(NH_4)_2HPO_4$-S flux or $Y_2O_3$:Eu and $BaCl_2 \cdot 2H_2O$ flux and heat treating said mixture at a temperature according to the following schedule:
   $Y_3Al_5O_{12}$:Tb and $BaF_2$ flux at 1400° to 1700° C.,
   $Y_2O_2S$:Eu and $Na_2CO_3$-$(NH_4)_2HPO_4$-S flux at 900° to 1000° C., and
   $Y_2O_3$:Eu and $BaCl_2,2H_2O$ flux at 1400° C.
   the heat treatment in each instance being sufficient so that the fluorescent material recovers substantially all the luminescence lost as a result of pulverizing.

2. A method according to claim 1 wherein said fluorescent material is $Y_3Al_5O_{12}$:Tb.

3. A method according to claim 1 wherein said fluorescent materiasl is $Y_2O_2S$:Eu.

4. A method according to claim 1 wherein said fluorescent material is $Y_2O_3$:Eu.

* * * * *